United States Patent [19]

Adachi et al.

[11] Patent Number: 5,639,823
[45] Date of Patent: Jun. 17, 1997

[54] ONE-PACKAGE, ROOM-TEMPERATURE-VULCANIZABLE, SILICONE ELASTOMER COMPOSITION

[75] Inventors: Hiroshi Adachi; Toshio Saruyama, both of Chiba Prefecture, Japan

[73] Assignee: Dow Corning Toray Silicone Co., Ltd., Tokyo, Japan

[21] Appl. No.: 534,964

[22] Filed: Sep. 28, 1995

[30] Foreign Application Priority Data

Sep. 30, 1994 [JP] Japan .................................. 6-261953

[51] Int. Cl.$^6$ .......................................... C08L 83/04
[52] U.S. Cl. ..................... 524/864; 524/863; 528/17; 528/18; 528/21; 528/34
[58] Field of Search ........................ 528/18, 17, 21, 528/34; 524/863, 864

[56] References Cited

U.S. PATENT DOCUMENTS

| | | | |
|---|---|---|---|
| 3,189,576 | 6/1965 | Sweet | 528/22 |
| 3,274,145 | 9/1966 | Dupree | 260/37 |
| 3,762,978 | 10/1973 | Holmes et al. | 156/308 |
| 3,957,714 | 5/1976 | Clark et al. | 260/33.6 SB |
| 4,115,356 | 9/1978 | Hilliard | 528/18 |
| 4,293,616 | 10/1981 | Smith, Jr. et al. | 428/447 |
| 4,482,670 | 11/1984 | Saam et al. | 524/860 |
| 4,657,967 | 4/1987 | Klosowski et al. | 524/860 |
| 4,973,623 | 11/1990 | Haugsby et al. | 524/863 |
| 5,264,603 | 11/1993 | Altes et al. | 556/411 |
| 5,338,574 | 8/1994 | O'Neil et al. | 427/387 |
| 5,340,899 | 8/1994 | Altes | 528/34 |
| 5,357,025 | 10/1994 | Altes et al. | 528/42 |
| 5,373,079 | 12/1994 | Altes | 528/34 |

*Primary Examiner*—Melvyn I. Marquis
*Attorney, Agent, or Firm*—Roger H. Borrousch

[57] ABSTRACT

A non-yellowing one-package, RTV, silicone elastomer composition is prepared and has properties such that prior to its cure, it is highly workable and that during its cure does not crack or fissure even when deformed by external force. These one-package, room-temperature-vulcanizable, silicone elastomer compositions comprise (A) diorganopolysiloxane endblocked by oxime group-containing organic radicals where at least 50 mole of the end groups contain alkenyl radicals, (B) oxime group-containing organosilane where no more than 50 mole % of the silane molecules contain alkenyl, and (C) inorganic filler.

28 Claims, No Drawings

ONE-PACKAGE, ROOM-TEMPERATURE-VULCANIZABLE, SILICONE ELASTOMER COMPOSITION

FIELD OF THE INVENTION

This invention relates to a one-package, room-temperature-vulcanizable (RTV), silicone elastomer composition. More particularly, this invention relates to a one-package RTV silicone elastomer composition that prior to its cure is highly workable and that during its cure does not crack or fissure even when deformed by an outside force.

BACKGROUND OF THE INVENTION

Description of the Prior Art and Problems Therein

One-package, RTV, silicone elastomer compositions are in wide use as sealants, coatings, and adhesives for application to substrates, machinery, and devices in a number of sectors, such as the construction and civil engineering sectors and electrical and electronic sectors. The use of these one-package, RTV, silicone elastomer compositions involves their storage in a sealed container, such as a tube or cartridge; then, at the actual point of application, extrusion of the silicone elastomer composition as a paste; and thereafter finishing the surface to smoothness using, for example, a spatula. Thus, the surface of the composition must not cure for the particular period of time elapsing from extrusion into the atmosphere until finishing. Moreover, even when the surface has begun to cure, additional time is required for the curing region to develop adequate mechanical strength, and deformation of the composition by outside forces is problematic during the time interval extending from cure initiation at the surface until the development of mechanical strength. In specific terms, when subjected to a stretching or elongational deformation, the curing region will rupture due to its inadequate mechanical strength. This occurrence of rupture in one location can lead to fracture of the entire body after its cure due to stress concentration at the aforesaid rupture site.

The occurrence of rupture during the course of curing can be prevented by increasing the cure rate of subject silicone elastomer compositions, but simply increasing the cure rate functions to shorten the working time available for spatula finishing. The use of this approach is also associated with a ready tendency for the silicone elastomer composition to yellow during storage. It is therefore desirable to develop a one-package, RTV, silicone elastomer composition that exhibits an acceptable working time and still rapidly develops mechanical strength once curing has started.

Problems to Be Solved by the Invention

The inventors achieved the present invention as a result of extensive investigations directed to solving the problems described above.

In specific terms, the present invention takes as its object the introduction of a nonyellowing, one-package, RTV, silicone elastomer composition that prior to its cure is highly workable and that during its cure does not crack or fissure even when deformed by external force.

SUMMARY OF THE INVENTION

Means Solving the Problems and Function Thereof

The present invention relates to a one-package room-temperature-vulcanizable silicone elastomer composition comprising (A) 100 parts by weight of a diorganopolysiloxane having a 25° C. viscosity in the range of from 0.0005 to 0.3 m²/s and having at least 30 weight percent of the diorganopolysiloxane molecules in (A) with $R^1(XO)_2Si$— at both molecular chain terminals and up to 70 weight percent of the diorganopolysiloxane molecules in (A) having $R^1(XO)_2Si$— at one molecular chain terminal and $(R^6)_3Si$— at the other molecular chain terminal, wherein each $R^1$ is a radical independently selected from the group consisting of alkyl and alkenyl radicals with the proviso that at least 50 mole % thereof is alkenyl, each $R^6$ is a radical independently selected from the group consisting of alkyl and phenyl, and X is an organic radical with the formula —N=$CR^2R^3$ wherein $R^2$ and $R^3$ are each radicals independently selected from the group consisting of alkyl, phenyl, and alkenyl radicals, or with the formula

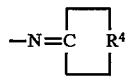

wherein $R^4$ is a divalent hydrocarbon radical having no more than 10 carbon atoms, (B) 0.5 to 20 parts by weight, based on 100 parts by weight of (A), of an organosilane with the formula $$R^5Si(OX)_3$$

wherein $R^5$ is a radical independently selected from the group consisting of alkyl, aryl, and alkenyl radicals with the proviso that no more than 50 mole % of the $R^5$ are alkenyl, and X is the same as defined in (A), and (C) 0.5 to 200 parts by weight inorganic filler based on 100 parts by weight of (A).

DETAILED DESCRIPTION OF THE PREFERRED EMBODIMENTS

The diorganopolysiloxane comprising component (A) is the main or base ingredient used by the present invention. At least 30 weight percent of the molecules of the diorganopolysiloxane of (A) have the $R^1(XO)_2$=Si— group at both molecular chain terminals wherein each $R^1$ is a radical independently selected from alkyl and atkenyl radicals with the proviso that at least 50 mole % thereof is alkenyl, and X is an organic radical with the formula —N=$CR^2R^3$ wherein $R^2$ and $R^3$ are each radicals independently selected from alkyl, phenyl, and alkenyl radicals or with the formula

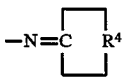

wherein $R^4$ is a divalent hydrocarbon radical having no more than 10 carbon atoms. The diorganopolysiloxane of (A) can have both molecular chain terminals capped with $R^1$ $(XO)_2$ Si— or it can be a mixture of diorganopolysiloxane molecules where at least 30 weight percent of the molecules have $R^1(XO)_2Si$— on both molecular chain terminals (ends) and up to 70 weight percent of the molecules have $R^1$ $(XO)_2$— on one molecular chain terminal and $R^6_3Si$— on the other molecular chain terminal, preferably the mixture of diorganopolysiloxane molecules have at least 60 weight percent of the molecules with $R^1(XO)_2Si$— on both molecular chain ends and up to 40 weight percent of the molecular with $R^1(XO)_2Si$— on one molecular chain end and $R^6_3Si$— on the other molecular chain end. When (A) is a mixture of diorganopolysiloxanes having both $R^1(XO)_2Si-$ ends and $R^6_3Si-$ ends, it is desirable to have at least 5 mole % of the ends as $R^6_3Si-$ ends and the preferred mixtures have from 10 to 30 mole % of the ends as $R^6_3Si-$ ends, especially for obtaining lower modulus sealant compositions. A method for preparing such mixtures is described by Dupree in U.S. Pat. No. 3,274,145, issued Sep. 20, 1996, which is hereby incorporated by reference to show the method of preparing mixtures having one reactive end and one inactive end. For example, mixtures of diorganopolysiloxanes with some molecules having both ends as hydroxy groups and diorganopolysiloxanes with one end being a hydroxyl and the other end being trimethyl-siloxy group.

The alkyl radical in the preceding formulas is exemplified by methyl, ethyl, and propyl, and the alkenyl radical is exemplified by vinyl and allyl. The divalent hydrocarbon radical is exemplified by alkylene radicals such as butylene, heptylene, and so forth. The present invention requires that alkenyl constitute at least 50 mole % of the $R^1$ in the molecules, and it is particularly preferable that at least 50 mole % of $R^1$ be vinyl. The pendant organic radicals of the diorganopolysiloxanes are exemplified by alkyl radicals such as methyl, ethyl, propyl, and so forth; aryl radicals such as phenyl and so forth; alkenyl radicals such as vinyl, allyl, and so forth; and haloalkyl radicals such as trifluoropropyl and so forth. The preferred diorganopolysiloxanes are the dimethylpolysiloxanes.

The diorganopolysiloxane must have a 25° C. viscosity in the range from 0.0005 to 0.3 m²/s, preferably from 0.001 to 0.1 m²/s. The postcure mechanical strength declines at viscosities below 0.0005 m²/s, while the uncured silicone elastomer composition has a substantially reduced workability when this viscosity exceeds 0.3 m²/s. The diorganopolysiloxane has an essentially linear molecular structure, although there is no prohibition on the presence of a relatively small amount of branched molecular structure.

The organosilane used as component (B) functions as a crosslinker for component (A). The general formula for component (B) is $$R^5Si(OX)_3$$

wherein $R^5$ is a radical independently selected from alkyl, aryl, and alkenyl radicals with the proviso that no more than 50 mole % thereof is alkenyl, and X is defined in the description for (A). Typical examples of the organosilane are methyltri(methyl ethyl ketoximo)silane, vinyltri(methyl ethyl ketoximo) silane, n-propyltri(methyl ethyl ketoximo) silane, phenyltri(methyl ethyl ketoximo)silane, methyltri (dimethyl ketoximo)silane, and the like. Preferred component (B) are vinyltri-(methyl ethyl ketoximo) silane, methyltri(methyl ethyl ketoximo)silane, and combinations thereof.

The amount of component (B) is determined based on such considerations as component (C) and the impurities (e.g., water and so forth) therein and the balance with component (A) wherein the balance with component (A) relates to the mechanical properties required of the cured silicone elastomer. However, the amount of component (B) is preferably in the range of 0.5 to 20 parts by weight per 100 parts by weight of component (A), preferably 3 to 15 parts by weight silane per 100 parts by weight of (A). The cure will be unacceptable at below 0.5 part by weight, while amounts in excess of 20 parts by weight have such negative effects as an inability to obtain a complete cure.

The inorganic filler comprising component (C) functions to improve the mechanical properties of the cured silicone elastomer composition. Reinforcing microparticulate silicas such as wet-process silicas and dry-process silicas are typically used as component (C), but microparticulate calcium carbonate, diatomaceous earth, quartz micropowder, and the like may also be used. In the case of reinforcing microparticulate silicas, it will be advantageous to use silica with a BET surface of 50 to 400 m²/g. These microparticulate silicas rather readily adsorb moisture on their surface, which will react with component (B) when mixed into the composition and can thereby cause a deterioration in the properties of the invention composition. This makes it desirable to eliminate this adsorbed water to the maximum extent possible prior to admixture of this component. Thus, while microparticulate silicas may be directly used without modification, surface-hydrophobicized microparticulate silicas may also be used. Said hydrophobicized silicas are preferred and are exemplified by silicas that have been treated with hexamethyldisilazane, dimethyldichlorosilane, or methylmethoxysilane. Component (C) is added at 0.5 to 200 parts by weight per 100 parts by weight component (A). A preferred amount of component (C) is from 3 to 150 parts by weight per 100 parts by weight of (A). For filler of (C), a satisfactory reinforcing effect is not manifested by the cured silicone elastomer at amounts of less than 0.5 parts by weight, while amounts in excess of 200 parts by weight cause a loss of elasticity by the cured product and also make it difficult to extrude the silicone elastomer composition from its container. The preferred range for reinforcing silica fillers is from 3 to 20 parts by weight per 100 parts by weight of (A).

In addition to the components (A), (B), and (C) described above, it is recommended for the present invention that a curing catalyst, component (D), also be added in order to accelerate the cure of components (A) and (B). Exemplary of subject component (D) are tin catalysts such as the dialkyltin dicarboxylates, illustrated by dibutyltin dilaurate and dibutyltin diacetate, titanate esters such as tetrabutyl titanate, and amine catalysts such as tetramethylguanidine. Tin catalysts are preferred. A single type of component (D) is ordinarily used, but two or more types may be used in combination. When this component added, it should be added in the range from 0.01 to 5 parts by weight per 100 parts by weight component (A). The addition of more than 5 parts by weight causes a number of negative effects, such as yellowing and a loss of water resistance and/or heat resistance. The preferred amount of curing catalyst (D) is from 0.01 to 1 part by weight per 100 parts by weight of (A).

The compositions can be prepared by mixing the above-described components (A), (B), and (C) to homogeneity in the absence of moisture. The mixing sequence can be as follows: preliminarily mixing component (B) into component (A) followed by the admixture of component (C); or, preliminarily mixing component (C) into component (A) followed by the admixture of component (B).

While the compositions comprise components (A) to (C) or (A) to (D) as described above, they can also contain those additives known for use in silicone elastomer compositions insofar as the object of the present invention is not impaired. These additives are exemplified by silanol-endblocked diorgano-polysiloxanes, trimethylsiloxy-endblocked organopolysiloxanes, various types of silicone resins, fluidity regulators, adhesion promoters, pigments, heat stabilizers, flame retardants, organic solvents, and so forth. For compositions which require adhesion, it is preferred to include in the composition an adhesion promoter such as gamma-(2-aminoethyl)aminopropyltri-methoxysilane which can provide excellent adhesion to more substrates than the compositions without an adhesion promoter.

The inventive compositions are characterized by their excellent storage stability in the absence of moisture and by an excellent precure workability. Moreover, they are non-yellowing and are also distinguished by the fact that their surfaces do not crack or fissure even when deformed by an outside force during the course of curing. These features make these compositions particularly useful as an adhesive, coating, sealant and the like.

The present invention will be explained in greater detail in the following working and comparative examples. The viscosities reported in the examples are the values measured at 25° C., and m$^2$/s is an abbreviation for square meters per second. "Part" or "parts" in the following examples are "part by weight" or "parts by weight." Dried nitrogen gas was used in the following examples where it is referred to, for instance, as "nitrogen blanket" or as "nitrogen atmosphere." Polymer A referenced below was a mixture of 70 weight% dimethylpolysiloxane (viscosity=0.017 m$^2$/s) endblocked at both terminals by hydroxyl and 30 weight % dimethylpolysiloxane (viscosity=0.017 m$^2$/s) endblocked at one terminal by hydroxyl and endblocked at the other terminal by trimethylsiloxy. Polymer B referenced below was dimethylpolysiloxane (viscosity=0.012 m$^2$/s) endblocked at both terminals by hydroxyl.

The properties of the silicone elastomer compositions prepared in the following examples and comparative examples were measured by the following methods.

TACK-FREE-TIME

Tack-free-time was evaluated as an index of the working time. The evaluation method used was in accordance with Japanese Industrial Standard (JIS) A-5758.

SURFACE CRACKING TIME

This was evaluated as an index of the tendency for the silicone elastomer composition to crack during the course of its cure. The method first involved preparing test specimen by first applying a silicone elastomer composition on 10 or more aluminum sheets, curing for a prescribed period of time at 25° C., and then executing a 180° fold in each aluminum sheet at predetermined time intervals. The time interval required until a curing composition of a test specimen showed no occurrence of cracking in the surface at the fold of the test specimen was defined as the surface cracking time. The surface cracking time was determined by folding one of the coated test specimen at 180 degrees during the curing process about every 5 minutes (measured from the time when an aluminum sheet's coating operation with a silicone elastomer composition was completed) for the first 30 minutes and then every 10 to 30 minutes thereafter. Surface cracking times of 60 minutes or less are taken as indicative, from a practical standpoint, of a low probability of cracking during the course of curing.

STORAGE STABILITY (yellowing)

The silicone elastomer composition was filled into a 330-cc plastic cartridge and held for 8 weeks in a 95% humidity/40° C. atmosphere. The plastic cartridge was then cut open with a cutting knife, and the color change in the silicone elastomer composition was visually evaluated.

REFERENCE EXAMPLE 1

While operating under a nitrogen blanket, 15.5 g vinyltri(methyl ethyl ketoximo)silane was mixed for 30 minutes at room temperature into 1,000 g polymer A. The mixture was then analyzed by $^{29}$Si—NMR, which confirmed that all the hydroxyl in polymer A had been capped by the vinyltri(methyl ethyl ketoximo) silane. This polymer mixture, hereinafter designated as polymer mixture P1, was stored under nitrogen and in addition to the capped polymer, it contained about 0.25 weight percent unreacted vinyltri(methyl ethyl ketoximo)silane and about 0.35 weight percent of methylethylketoxime (a by-product).

REFERENCE EXAMPLE 2

23.8 g vinyltri(methyl ethyl ketoximo) silane and 23.8 g methyltri(methyl ethyl ketoximo)silane were mixed while operating under a nitrogen blanket, and this mixture was then mixed for 30 minutes at room temperature into 1,000 g polymer A while operating under a nitrogen blanket. The resulting mixture was analyzed by $^{29}$Si—NMR, which confirmed that 70 mole % of the hydroxyl in polymer A had been capped by the vinyltri(methyl ethyl ketoximo)silane. This polymer mixture, hereinafter designated as polymer mixture P2, was stored under nitrogen, and in addition to the capped polymer, it contained about 1.4 weight percent vinyltri(methyl ethyl ketoximo)silane, 1.9 weight percent methyltri(methyl ethyl ketoximo)silane, and about 0.34 weight percent of methylethylketoxime.

REFERENCE EXAMPLE 3

While operating under a nitrogen blanket, 15.5 g vinyltri(methyl ethyl ketoximo)silane was mixed for 30 minutes at room temperature into 1,000 g polymer B. The mixture was then analyzed by $^{29}$Si—NMR, which confirmed that all the hydroxyl in polymer B had been capped by the vinyltri(methyl ethyl ketoximo) silane. This polymer mixture, hereinafter designated as polymer mixture P3, was stored under nitrogen, and in addition to the capped polymer, it contained about 0.2 weight percent of vinyltri(methyl ethyl ketoximo)silane, and about 0.4 weight percent methylethylketoxime.

REFERENCE EXAMPLE 4

While operating under a nitrogen blanket, 47.6 g methyltri(methyl ethyl ketoximo) silane was mixed for 30 minutes at room temperature into 1,000 g polymer A. The mixture was then analyzed by $^{29}$Si—NMR, which confirmed that all the hydroxyl in polymer A had been capped by the methyltri(methyl ethyl ketoximo)silane. This polymer mixture, hereinafter designated as polymer mixture P4, was stored under nitrogen, and in addition to the capped polymer, it contained about 3.3 weight percent methyltri(methyl ethyl ketoximo)silane and about 0.35 weight percent methylethylketoxime.

REFERENCE EXAMPLE 5

11.9 g vinyltri(methyl ethyl ketoximo)silane and 35.7 g methyltri(methyl ethyl ketoximo) silane were mixed while operating under a nitrogen blanket, and this mixture was then mixed for 30 minutes at room temperature into 1,000 g polymer A while operating under a nitrogen blanket. The resulting mixture was analyzed by $^{29}$Si—NMR, which confirmed that 36 mole % of the hydroxyl in polymer A had been capped by the vinyltri(methyl ethyl ketoximo)silane. This polymer mixture, hereinafter designated as polymer mixture P5, was stored under nitrogen, and in addition contained about 0.7 weight percent vinyltri(methyl ethyl ketoximo)silane, 2.6 weight percent methyltri(methyl ethyl ketoximo)silane, and about 0.35 weight percent methylethylketoxime.

EXAMPLE 1

100 g polymer mixture P1 (preparation described in Reference Example 1) and 11.5 g dry-method silica with a BET surface area of 200 m2/g (preliminarily dried for 3 hours at 120° C.), were thoroughly mixed under a nitrogen atmosphere. A one-package, RTV, silicone elastomer composition was then prepared by the addition with thorough mixing under nitrogen of 4.76 g methyltri(methyl ethyl ketoximo)silane as supplemental (supplemental meaning an amount of crosslinker in addition to the amount of unreacted silane in the polymer mixture) cross-linker, 0.86 g gamma-(2-aminoethyl)aminopropyltrimethoxysilane as adhesion promoter, and 0.25 g dibutyltin dilaurate as curing catalyst. The properties of this composition were measured, and the results were as reported in Table 1.

EXAMPLE 2

100 g polymer mixture P2 (preparation described in Reference Example 2) and 11.5 g dry-method silica with a BET surface area of 200 m$^2$/g (preliminarily dried for 3 hours at 120° C.) were thoroughly mixed under a nitrogen atmosphere. A one-package, RTV, silicone elastomer composition was then prepared by the addition with thorough mixing under nitrogen of 0.86 g gamma-(2-aminoethyl)aminopropyltrimethoxysilane as adhesion promoter and 0.25 g dibutyltin dilaurate as curing catalyst. The crosslinker was the unreacted vinyltri(methyl ethyl ketoximo)silane and methyltri(methyl ethyl ketoximo)silane present in polymer mixture P2. The properties of this composition were measured, and the results were as reported in Table 1.

EXAMPLE 3

100 g polymer mixture P3 (preparation described in Reference Example 3) and 11.5 g dry-method silica with a BET surface area of 200 m$^2$/g (preliminarily dried for 3 hours at 120° C.) were thoroughly mixed under a nitrogen atmosphere. A one-package, RTV, silicone elastomer composition was then prepared by the addition with thorough mixing under nitrogen of 4.76 g methyltri(methyl ethyl ketoximo)silane as supplemental cross-linker, 0.86 g gamma-(2-aminoethyl)aminopropyltrimethoxy-silane as adhesion promoter, and 0.25 g dibutyltin dilaurate as curing catalyst. The properties of this composition were measured, and the results were as reported in Table 1.

EXAMPLE 4

100 g polymer mixture P1 (preparation described in Reference Example 1) and 11.5 g dry-method silica with a BET surface area of 130 m$^2$/g (preliminarily dried for 3 hours at 120° C.) were thoroughly mixed under a nitrogen atmosphere. A one-package RTV silicone elastomer composition was then prepared by the addition with thorough mixing under nitrogen of 7.44 g n-propyltri(methyl ethyl ketoximo) silane as supplemental cross-linker, 0.86 g gamma-(2-aminoethyl)aminopropyltrimethoxysilane as adhesion promoter, and 0.25 g dibutyltin dilaurate as curing catalyst. The properties of this composition were measured, and the results were as reported in Table 1.

COMPARATIVE EXAMPLE 1

100 g polymer mixture P4 (preparation described in Reference Example 4) and 11.5 g dry-method silica with a BET surface area of 200 m$^2$/g (preliminarily dried for 3 hours at 120° C.) were thoroughly mixed under a nitrogen atmosphere. A one-package, RTV, silicone elastomer composition was then prepared by the addition with thorough mixing under nitrogen of 1.55 g vinyltri(methyl ethyl ketoximo)silane as supplemental cross-linker, 0.86 g gamma-(2-aminoethyl)aminopropyltrimethoxysilane as adhesion promoter, and 0.25 g dibutyltin dilaurate as curing catalyst. The properties of this composition were measured, and the results were as reported in Table 1.

COMPARATIVE EXAMPLE 2

100 g polymer mixture P5 (preparation described in Reference Example 5) and 11.5 g dry-method silica with a BET surface area of 200 m$^2$/g (preliminarily dried for 3 hours at 120° C.) were thoroughly mixed under a nitrogen atmosphere. A one-package, RTV, silicone elastomer composition was then prepared by the addition with thorough mixing under nitrogen of 0.86 g gamma-(2-aminoethyl) aminopropyltrimethoxysilane as adhesion promoter, and 0.25 g dibutyltin dilaurate as curing catalyst. The crosslinker was the unreacted vinyltri(methyl ethyl ketoximo) silane and methyltri(methyl ethyl ketoximo)silane present in the polymer mixture P5. The properties of this composition were measured, and the results were as reported in Table 1.

COMPARATIVE EXAMPLE 3

100 g polymer mixture P1 (preparation described in Reference Example 1) and 11.5 g dry-method silica with a BET surface area of 200 m=/g (preliminarily dried for 3 hours at 120° C.) were thoroughly mixed under a nitrogen atmosphere. A one-package, RTV, silicone elastomer composition was then prepared by the addition with thorough mixing under nitrogen of 4.76 g vinyltri(methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst. The properties of this composition were measured, and the results were as reported in Table 1.

TABLE 1

|  | Working Examples | | | | Comparative Examples | | |
| --- | --- | --- | --- | --- | --- | --- | --- |
|  | 1 | 2 | 3 | 4 | 1 | 2 | 3 |
| Tack-free time (minutes) | 4 | 4 | 4 | 10 | 4 | 4 | 3 |
| Surface cracking time (minutes) | 25 | 4 | 15 | 10 | >240 | 180 | 25 |
| Storage stability (yellowing) | NC* | NC* | NC* | NC* | NC* | NC* | (1) |

*NC = no change in color
(1) = significant yellowing occurred (substantial discoloration)

EXAMPLE 5

100 g polymer A and 11.5 g dry-method silica with a BET surface area of 130 m$^2$/g (surface preliminarily treated with hexamethyldisilazane and dimethyldichlorosilane) were thoroughly mixed under a nitrogen atmosphere. Into this was then mixed under nitrogen 1.39 g vinyltri(methyl ethyl ketoximo)silane as polymer end capper. This was followed after a period of 15 minutes by the addition with thorough mixing under nitrogen of 6.81 g methyltri(methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst to give a one-package, RTV, silicone elastomer composition. The properties of this composition were measured, and the results were as reported in Table 2.

COMPARATIVE EXAMPLE 4

100 g polymer A and 11.5 g dry-method silica with a BET surface area of 130 m$^2$/g (surface preliminarily treated with hexamethyldisilazane and dimethyldichlorosilane) were thoroughly mixed under a nitrogen atmosphere. Into this was then mixed under nitrogen 1.39 g methyltri(methyl ethyl ketoximo)silane as polymer end capper. This was followed after a period of 5 minutes by the addition with thorough mixing under nitrogen of 6.81 g vinyltri(methyl ethyl ketoximo)silane as supplemental crosslinker, 0.86 g gamma-(2-aminoethyl)aminopropyltrimethoxysilane as adhesion promoter, and 0.25 g dibutyltin dilaurate as curing catalyst to give a one-package, RTV, silicone elastomer composition. The properties of this composition were measured, and the results were as reported in Table 2.

TABLE 2

|  | Example 5 | Comparative Example 4 |
| --- | --- | --- |
| Tack-free time (minutes) | 8 | 30 |
| Surface cracking time (minutes) | 10 | 80 |

EXAMPLE 6

A one-package, RTV, silicone elastomer composition was prepared by the same method as shown in Example 1 and the same ingredients and amounts were used except the gamma-(2-aminoethyl)-aminopropyltrimethoxysilane was omitted. The tack-free-time was 5 minutes, the surface crack time was 20 minutes, and no yellowing was observed after storage according to the Storage Stability test described previously herein. This RTV composition had excellent adhesion to glass, even after hot water immersion. The adhesion to glass for this RTV composition was better than the adhesion of the RTV composition with the adhesion promoter.

Effects of the Invention

Because the one-package, RTV, silicone elastomer composition according to the present invention comprises components (A), (B), and (C.) and in particular because it contains as its main component the special diorganopolysiloxane (A), it is characterized by resistance to yellowing, excellent workability prior to its cure, and resistance to cracking during its cure even when subjected to deformation by outside forces.

That which is claimed is:

1. A one-package, room-temperature-vulcanizable, silicone elastomer composition comprising (A) 100 parts by weight of a diorganopolysiloxane having a 25° C. viscosity in the range of from 0.0005 to 0.3 m²/s and having at least 30 weight percent of the diorganopolysiloxane molecules in (A) with $R^1(XO)_2$Si— at both molecular chain terminals and up to 70 weight percent of the diorganopolysiloxane molecules in (A) having $R^1(XO)_2$Si— at one molecular chain terminal and $(R^6)_3$Si— at the other molecular chain terminal, wherein each $R^1$ is a radical independently selected from the group consisting of alkyl and alkenyl radicals with the proviso that at least 50 mole % thereof is alkenyl, each $R^6$ is a radical independently selected from the group consisting of alkyl and phenyl, and X is an organic radical with the formula —N=CR²R³ wherein $R^2$ and $R^3$ are each radicals independently selected from the group consisting of alkyl, phenyl, and alkenyl radicals, or with the formula

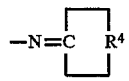

wherein $R^4$ is a divalent hydrocarbon radical having no more than 10 carbon atoms, (B) 0.5 to 20 parts by weight, based on 100 parts by weight of (A), of an organosilane with the formula $R_5Si(OX)_3$ wherein $R^5$ is a radical independently selected from the group consisting of alkyl, aryl, and alkenyl radicals with the proviso that no more than 50 mole % of the $R^5$ are alkenyl, and X is the same as defined in (A), and (C.) 0.5 to 200 parts by weight inorganic filler based on 100 parts by weight of (A).

2. The one-package, room-temperature-vulcanizable, silicone elastomer composition in accordance with claim 1 in which the atkenyl radical is vinyl radical.

3. The one-package, room-temperature-vulcanizable, silicone elastomer composition in accordance with claim 1 in which the inorganic filler is microparticulate silica.

4. The one-package, room-temperature-vulcanizable, silicone elastomer composition in accordance with claim 1 further comprising (D) 0.01 to 5 parts by weight of a curing catalyst based on 100 parts by weight of (A).

5. The one-package, room-temperature-vulcanizable, silicone elastomer composition in accordance with claim 1 in which the 25° C. viscosity is in the range of from 0.001 to 0.1 m²/s.

6. The one-package, room-temperature-vulcanizable, silicone elastomer composition in accordance with claim 2 in which the 25° C. viscosity is in the range of from 0.001 to 0.1 m²/s.

7. The one-package, room-temperature-vulcanizable, silicone elastomer composition in accordance with claim 3 in which the 25° C. viscosity is in the range of from 0.001 to 0.1 m²/s.

8. The one-package, room-temperature-vulcanizable, silicone elastomer composition in accordance with claim 4 in which the 25° C. viscosity is in the range of from 0.001 to 0.1 m²/s.

9. The one-package, room-temperature-vulcanizable, silicone elastomer composition in accordance with claim 1 in which (B) is present in an amount of from 3 to 15 parts by weight per 100 parts by weight of (A) and is a combination of vinyltri(methyl ethyl ketoximo)silane and methyltri (methyl ethyl ketoximo)silane catalyst based on 100 parts by weight of (A).

10. The one-package, room-temperature-vulcanizable, silicone elastomer composition in accordance with claim 5 in which (B) is present in an amount of from 3 to 15 parts by weight per 100 parts by weight of (A) and is a combination of vinyltri(methyl ethyl ketoximo)silane and methyltri(methyl ethyl ketoximo)silane catalyst based on 100 parts by weight of (A).

11. The one-package, room-temperature-vulcanizable, silicone elastomer composition in accordance with claim 6 in which (B) is present in an amount of from 3 to 15 parts by weight per 100 parts by weight of (A) and is a combination of vinyltri(methyl ethyl ketoximo)silane and methyltri(methyl ethyl ketoximo)silane catalyst based on 100 parts by weight of (A).

12. The one-package, room-temperature-vulcanizable, silicone elastomer composition in accordance with claim 7 in which (B) is present in an amount of from 3 to 15 parts by weight per 100 parts by weight of (A) and is a combination of vinyltri(methyl ethyl ketoximo)silane and methyltri(methyl ethyl ketoximo)silane catalyst based on 100 parts by weight of (A).

13. The one-package, room-temperature-vulcanizable, silicone elastomer composition in accordance with claim 8 in which (B) is present in an amount of from 3 to 15 parts by weight per 100 parts by weight of (A) and is a combination of vinyltri(methyl ethyl ketoximo)silane and methyltri(methyl ethyl ketoximo)silane catalyst based on 100 parts by weight of (A).

14. The one-package, room-temperature-vulcanizable, silicone elastomer composition in accordance with claim 3 in which the silica of (C.) is present in an amount of from 3 to 20 parts by weight per 100 parts by weight of (A).

15. The one-package, room-temperature-vulcanizable, silicone elastomer composition in accordance with claim 7 in which the silica of (C.) is present in an amount of from 3 to 20 parts by weight per 100 parts by weight of (A).

16. The one-package, room-temperature-vulcanizable, silicone elastomer composition in accordance with claim 12 in which the silica of (C.) is present in an amount of from 3 to 20 parts by weight per 100 parts by weight of (A).

17. The one-package, room-temperature-vulcanizable, silicone elastomer composition in accordance with claim 4 in which the curing catalyst (D) is a tin catalyst.

18. The one-package, room-temperature-vulcanizable, silicone elastomer composition in accordance with claim 17 in which the tin catalyst is a dialkyltin dicarboxylate.

19. The one-package, room-temperature-vulcanizable, silicone elastomer composition in accordance with claim 8 in which the curing catalyst (D) is a tin catalyst.

20. The one-package, room-temperature-vulcanizable, silicone elastomer composition in accordance with claim 19 in which the tin catalyst is a dialkyltin dicarboxylate.

21. The one-package, room-temperature-vulcanizable, silicone elastomer composition in accordance with claim 3 further comprising (D) 0.01 to 5 parts by weight of a curing catalyst based on 100 parts by weight of (A).

22. The one-package, room-temperature-vulcanizable, silicone elastomer composition in accordance with claim 21 in which the silica of (C.) is present in an amount of from 3 to 20 parts by weight per 100 parts by weight of (A), and the curing catalyst (D) is a tin catalyst.

23. The one-package, room-temperature-vulcanizable, silicone elastomer composition in accordance with claim 1 further comprising an adhesion promoter.

24. The one-package, room-temperature-vulcanizable, silicone elastomer composition in accordance with claim 13 further comprising an adhesion promoter.

25. The one-package, room-temperature-vulcanizable, silicone elastomer composition in accordance with claim 16 further comprising an adhesion promoter.

26. The one-package, room-temperature-vulcanizable, silicone elastomer composition in accordance with claim 5 in which the diorganopolysiloxane of (A) is a dimethylpolysiloxane.

27. The one-package, room-temperature-vulcanizable, silicone elastomer composition in accordance with claim 26 in which (A) is a mixture of dimethylpolysiloxanes where at least 5 mole % of the molecular chain terminals are $R^6_3Si$—.

28. The one-package, room-temperature-vulcanizable, silicone elastomer composition in accordance with claim 27 in which (A) is a mixture of dimethylpolysiloxanes where from 10 to 30 mole % of the molecular chain terminals are $R^6_3Si$—.

* * * * *